US005642799A

United States Patent [19]
Warrilow

[11] Patent Number: 5,642,799
[45] Date of Patent: Jul. 1, 1997

[54] CONVEYOR INCLUDING A BRAKING DEVICE

[75] Inventor: Jonathan Warrilow, Wyberton, Great Britain

[73] Assignee: Dexion Group PLC, Hemel Hempstead, United Kingdom

[21] Appl. No.: 602,995

[22] Filed: Feb. 16, 1996

[51] Int. Cl.[6] .......... B65G 13/00
[52] U.S. Cl. .......... 193/35 A
[58] Field of Search .......... 193/35 A; 198/832.2

[56] References Cited

U.S. PATENT DOCUMENTS

| | | | |
|---|---|---|---|
| 1,562,680 | 11/1925 | Bohn | 193/35 A X |
| 3,314,514 | 4/1967 | Hundhausen et al. | 193/35 A |
| 3,918,561 | 11/1975 | Isacsson | 193/35 A |
| 4,091,907 | 5/1978 | Taylor | 193/35 A |
| 4,219,114 | 8/1980 | Kovacs | 193/35 A X |
| 4,253,558 | 3/1981 | Roeing et al. | 193/35 A |
| 5,086,903 | 2/1992 | Agnoff | 193/35 A |

FOREIGN PATENT DOCUMENTS

| | | | |
|---|---|---|---|
| 2627169 | 2/1988 | France . | |
| 1204585 | 11/1965 | Germany | 193/35 A |
| 1994374 | 5/1968 | Germany . | |
| 0398302 | 2/1974 | U.S.S.R. | 193/35 A |
| 0988675 | 1/1983 | U.S.S.R. | 193/35 A |
| 0984945 | 1/1983 | U.S.S.R. | 193/35 A |
| 8403685 | 9/1984 | WIPO . | |

*Primary Examiner*—James R. Bidwell
*Attorney, Agent, or Firm*—Wheat Camoriano Smith & Beres PLC

[57] ABSTRACT

A brake device for a conveyor has two load supporting conveyor rollers rotatable to enable a load thereon to be transported along the conveyor. The load supporting rollers are movable transversely to their axes of rotation by a load passing thereover against a resilient bias into engagement with a brake roller adapted to brake rotation of the conveyor rollers. The braking force exerted by the brake roller is dependent at least in part upon the weight of the load on the conveyor rollers.

10 Claims, 3 Drawing Sheets

18
210
19
18a
19a
20
26
26
23
27
24
25
22
21

CONVEYOR INCLUDING A BRAKING DEVICE

FIELD OF THE INVENTION

This invention relates to a conveyor including a braking device, particularly but not exclusively, a roller conveyor adapted to be inclined at a slight incline to enable loads placed thereon to move along the conveyor under the influence of gravity.

BACKGROUND OF THE INVENTION

In a known method of moving loads, the loads are placed on pallets and the pallets are placed on roller conveyors inclined at an angle to the horizontal so that the pallets move along, and down, the conveyor under the force of gravity. The speed of the loads must be controlled to ensure the safety of the system operatives and to ensure that the goods on the pallets are not damaged. In such systems it is therefore necessary to incorporate brakes to prevent the loads moving at too great a speed. Typically, in conveyors having a track formed by a plurality of conveyor rollers, the speed control is achieved by brake rollers. Brake rollers comprise a roll element of the roller conveyor which is acted upon directly by the load or, alternatively, may comprise a separate brake roller in contact with the underside of the rollers of the conveyor track. The brake rollers may either provide a constant braking force, or may include a centrifugally operable braking system which provides a braking force dependent upon the speed of rotation of the roller.

One problem of the known systems is that they do not adequately cater for variations in the weight of the individual loads, i.e., the braking force is not load-sensitive or load-proportional. An object of the present invention is to provide a conveyor in which the braking force applied to loads is load-sensitive.

SUMMARY OF THE INVENTION

According to the present invention there is provided a conveyor comprising at least one load supporting member having a load supporting surface movable to enable a load thereon to be transported along the conveyor, the load supporting member being further movable by a load thereon against a resilient bias into engagement with a brake device adapted to brake movement of the load support surface, the braking force exerted by the brake device being dependent at least in part upon the weight of the load on the load supporting member.

Preferably, the load supporting member comprises a conveyor roller, or a pair of conveyor rollers, which may be mounted in a frame so as to be movable towards and away from the brake device. The brake device preferably comprises a brake roller which may be mounted in said frame. The brake roller may be biased by resilient means towards the roller or rollers by spring means, preferably compression spring means. Adjustment means may be provided to adjust the initial contact force between the rollers and the brake roller. The braking force generated by the brake roller is preferably produced by centrifugal force derived from a rotating member of the brake roller.

DETAILED DESCRIPTION OF THE INVENTION

Figure 1:
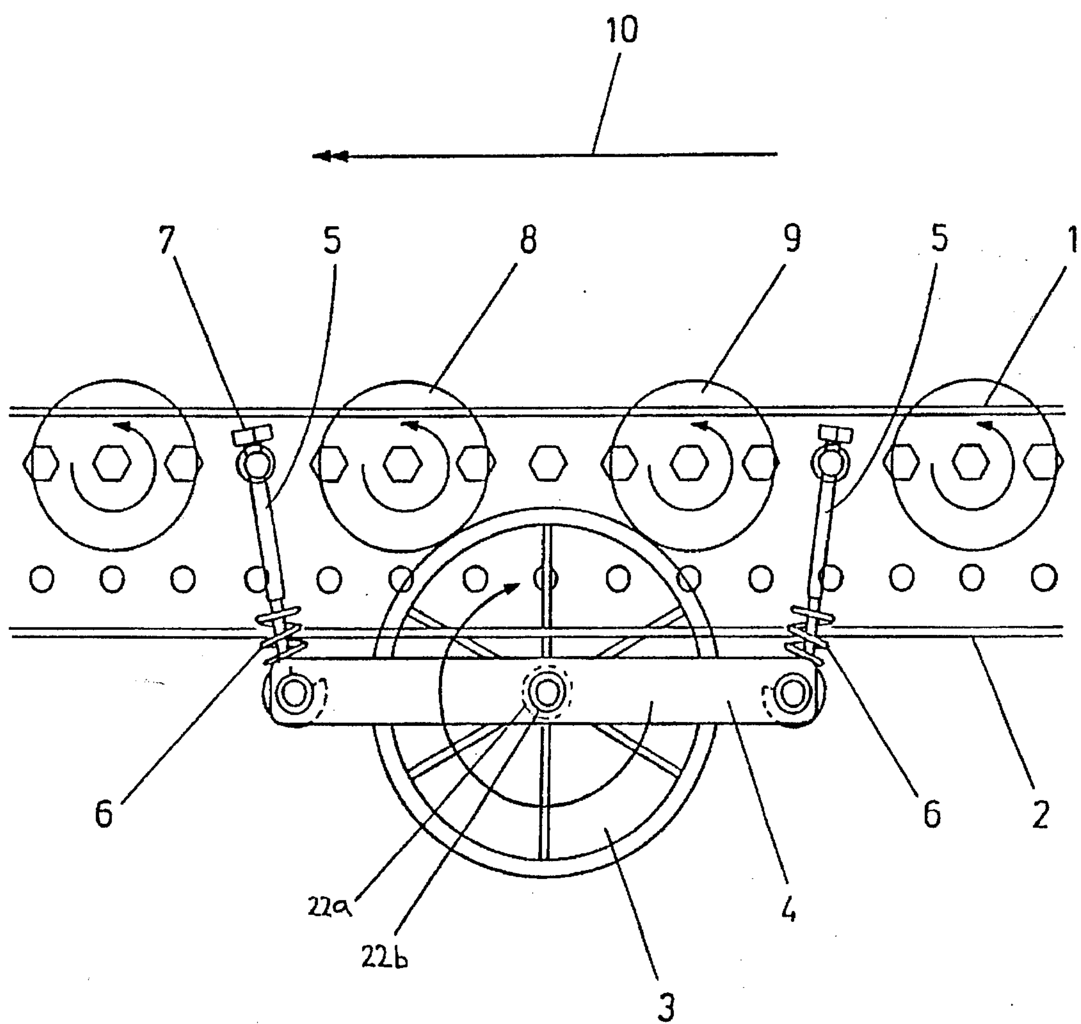
Figure 2:
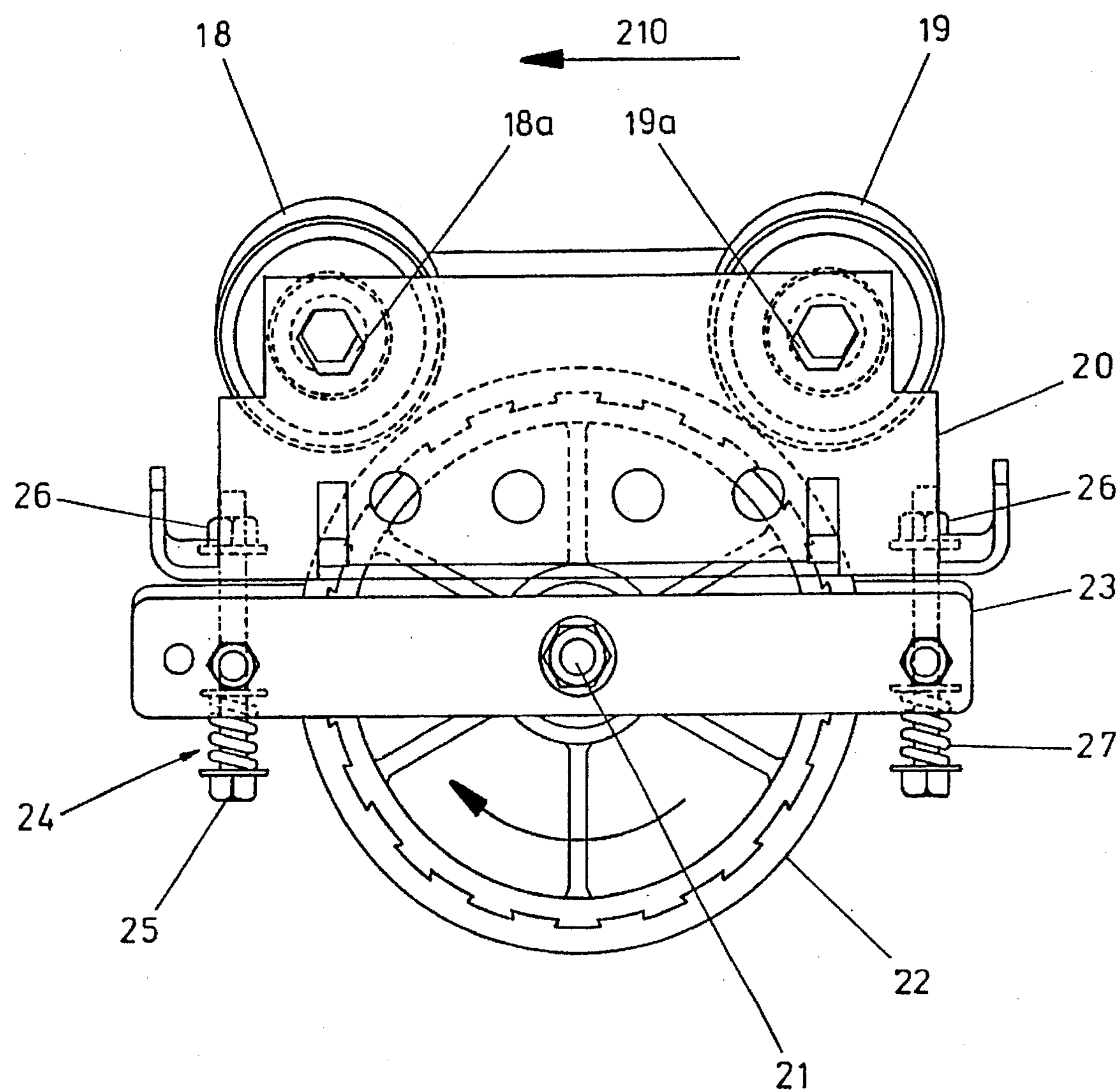
Figure 3:
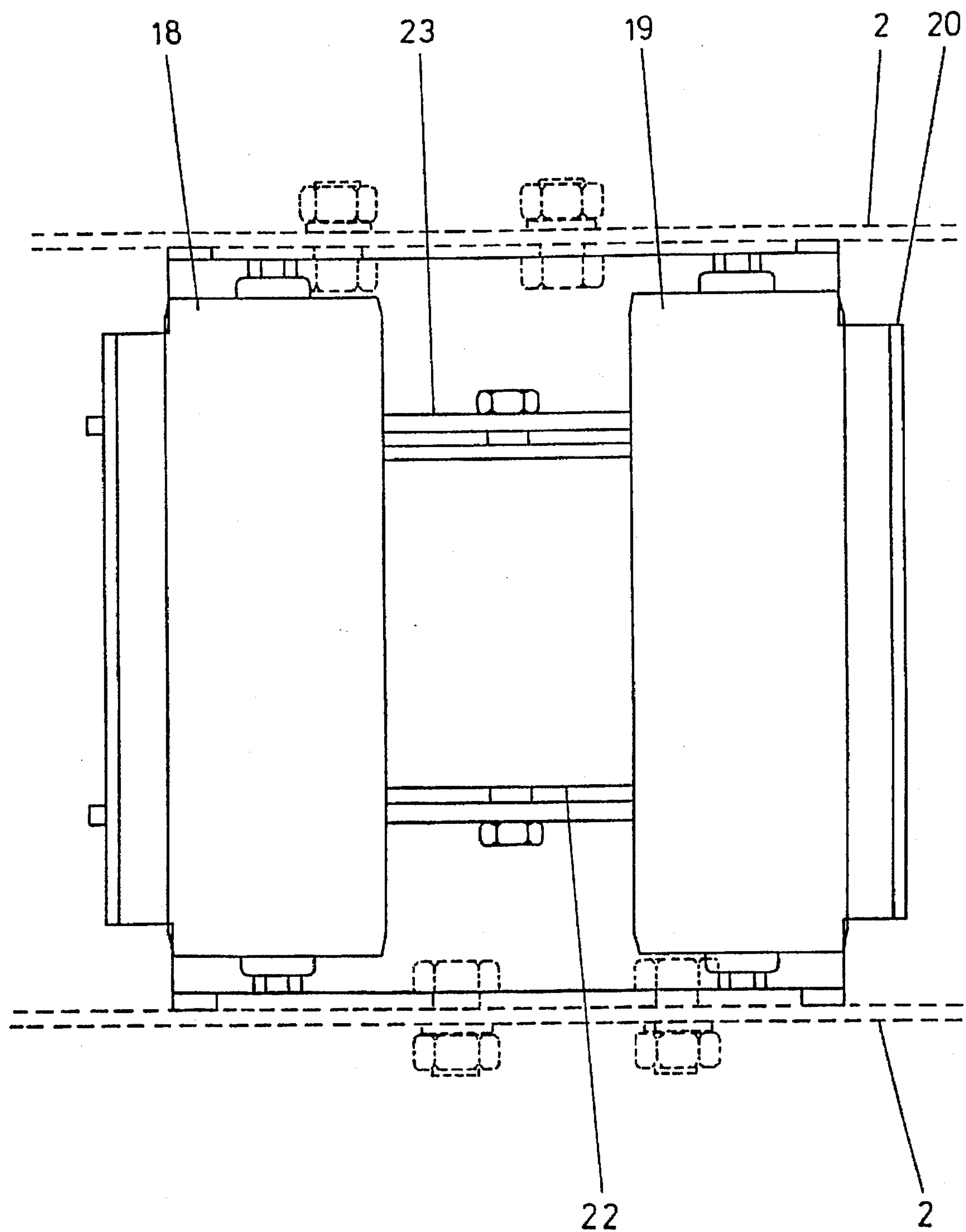

A preferred embodiment of the present invention will now be described by way of example with reference to the accompanying drawings in which:

FIG. 1 shows a known form of brake device incorporated in a roller conveyor, FIG. 2 shows a side view of the embodiment of the present invention, and, FIG. 3 shows a schematic plan view of the embodiment of FIG. 2.

Referring now to FIG. 1 there is shown a known brake roller mounted in a conveyor roller track, typically inclined at an angle of 4 degrees to the horizontal. The conveyor roller track consists of a plurality of freely rotatable conveyor rolls 1 mounted in spaced parallel relationship in a frame 2 in known fashion. A brake roller 3 is rotatably mounted in a frame 4. The frame 4 is connected to the frame 2 through a spring hanger arrangement 5 located at each end of the frame 4. The spring hanger arrangements 5 include coil tension springs 6, the tension of which is adjustable by means of a screw thread arrangement 7 to control the amount of force with which the brake roller 3 is biased into contact with two rolls 8 and 9 of the roller conveyor.

The brake roller 3 has on its outer surface a resilient sleeve formed of rubber or urethane through which the braking force generated by the brake roller is transmitted to the rolls 8 and 9. The braking force in the brake roller is generated by a centrifugal braking force generator (not shown) produced by the rotation of the brake roller. The brake roller 3 is rotated by a load passing along the conveyor in the direction of the arrows 10.

In order to provide sufficient friction to enable a satisfactory braking force to be transmitted between the rolls 8 and 9 and the brake roller 3, the brake roller must be urged into contact with the rolls 8 and 9 with a considerable force to enable the braking force required to handle heavy loads to be transmitted. This has the disadvantage that the rubber sleeve is always substantially compressed even when no braking is being carried out. The result is that the roller conveyors 8 and 9 do not allow a light load to pass across them as such light loads do not have sufficient inertia to overcome the resilience of the rubber sleeve. Light loads are therefore stopped dead by the brake action acting on the rolls 8 and 9 which prevents the rolls from rotating. Heavy loads have enough inertia to overcome the resilience of the rubber sleeve to rotate the brake roller 3 and to provide the brake force intended. It can thus be seen that the known types of brake roller mounting arrangement can only handle loads within a predetermined weight range. For handling light loads the springs are set with a minimal extension which causes little impression to be made in the rubber sleeve of the brake roller. The whole brake assembly is therefore easier to rotate and light loads can pass over the rollers 8 and 9 without being stopped dead. However, if heavy loads are passed along the conveyor with the same setting the steel rolls 8, 9 can slip on the rubber sleeve of the brake roller so that inadequate braking of the pallet results. The speed of heavy loads is therefore not checked adequately.

Referring now to FIGS. 2 and 3, FIG. 2 shows a side view of a brake roller arrangement in accordance with the present invention. As in the arrangement described in FIG. 1, the conveyor consists of a plurality of rolls arranged in a frame 2. The conveyor has two adjacent idler rolls 18 and 19 mounted in a frame 20. The rolls 18 and 19 are mounted in the frame 20 so as to be freely movable in elongate slots **18*a*, 19*a*, the longitudinal axes of which are directed towards the axis 21 of a brake roll 22. The brake roll 22 is rotatably mounted on bearings 22*a* on an axle 22*b* located in a frame member 23 which is supported in the frame 20 through adjustable mounting elements 24 located at opposite ends of the frame element 23**.

Each mounting element 24 consists of a threaded rod 25 or stud mounted through the frame 20, the position of the rod 25 relative to the frame 20 being determined by adjustment of an adjustment nut 26 located on the threaded rod 25. Each threaded rod 25 carries a concentric compression spring 27 and the frame element 23 is located freely on the rod 25 so as to rest on the upper end of the springs 27.

Initially, the adjustment nuts 26 are adjusted so that the brake roller rests lightly against the rolls 18 and 19 to bias the rolls into the upper region of their locating slots, in which position the upper surface of the rolls 18 and 19 is 2 mm higher than the corresponding load supporting surfaces of the remaining rolls in the conveyor. When a heavy load rests on the rolls 18, 19, the rolls are depressed to the bottom of their slots and in this position the upper surfaces of the rolls are in alignment with the load supporting surfaces of the remaining rolls in the conveyor.

In operation, when a light load passes along the conveyor the rolls 18 and 19 are not deflected to any great extent and no heavy impressions are created in the sleeve of the brake roller. Therefore the brake roller 22 can rotate relatively easily to provide the light braking force required. When however a heavy load passes along the conveyor, the rolls 18 and 19 are depressed against the resilient bias of the springs 27 which are compressed by an amount proportional to the weight of the load to thereby provide a much greater grip and hence to enable the transmission of a much greater braking force between the rolls 18 and 19 and the brake roller 22 to enable a larger brake force to be transmitted, as required to brake the heavy load. Thus, the amount of force capable of being transmitted between the rolls 18 and 19 and the brake roller 22 is dependent on the weight of the load passing along the conveyor.

It has been found that apparatus constructed in accordance with the invention increases the weight range, defined as the maximum load that will pass over the brake divided by the minimum load that will pass over the brake, from the standard of the known brake roller mounting arrangement which is of the order of between 5 and 10 to 1 to between 50 and 100 to 1. Thus, the one conveyor can cope with a considerably greater range of weight of load without its operation being affected adversely.

In order to prevent overloading of the brake roller bearings, which do not have the capacity to carry the full weight of a heavy pallet in a working installation, the force transmitted to the brake roller bearings is limited by limiting the amount of compression of the springs 27. The movement of the rolls 18, 19 is therefore limited by having a slot length of only 2 mm. After the rolls 18, 19 have been depressed by 2 mm by a pallet load, the roller axles bottom out in the slots **18*a*, 19*a* in the frame 20 so that the pallet load is transferred through the frame 20 into the main conveyor frame 2 to which the frame 20 is bolted. The maximum force imposed on the brake roller bearings is thus equal to 2 mm compression of the springs 27** which is below the rated capacity of the brake roller bearings.

What is claimed is:

1. A brake device for a conveyor, comprising:

a conveyor;

a freely rotatable idler roller mounted on said conveyor, said idler roller defining a load-supporting surface;

a brake roller mounted below said load-supporting surface;

a biasing member urging said brake roller upwardly; wherein, when a load is supported on said idler roller, it pushes said idler roller downwardly against the brake roller, which, in turn, pushes said brake roller downwardly, against the bias of said biasing member, so that the magnitude of the braking force is related to the weight of the load on the load-supporting surface.

2. A brake device as recited in claim 1, wherein said idler roller rests on said brake roller, so that said brake roller carries the entire weight of said idler roller and of any load that is carried on said idler roller.

3. A brake device according to claim 1 further including a frame, and a plurality of idler rollers which are mountable in the frame so as to be movable towards and away from the brake roller.

4. A brake device according to claim 1, wherein the biasing member comprises at least one compression spring.

5. A brake device according to claim 3, wherein the brake roller is mounted in said frame.

6. A brake device according to claim 1, wherein the brake roller comprises a rotating member, which rotating member produces the braking force by means of centrifugal force.

7. A brake device for a conveyor, the device comprising at least one load supporting member having a movable load supporting surface movable to enable a load thereon to be transported over the device, a brake roller mounted in a frame and adapted to brake movement of the load supporting surface by means of a braking force, resilient means providing a resilient bias, the load supporting member being movable against the resilient bias by the load thereon into engagement with the brake means and the magnitude of the braking force being dependent at least in part upon the weight of the load on the load supporting member, wherein adjustment means are provided to adjust an initial contact force between the load supporting member and the brake roller.

8. A brake device for a conveyor, the device comprising at least one load supporting member having a movable load supporting surface movable to enable a load thereon to be transported over the device, a brake roller adapted to brake movement of the load supporting surface by means of a braking force, resilient means providing a resilient bias, the load supporting member being movable against the resilient bias by the load thereon into engagement with the brake means and the magnitude of the braking force being dependent at least in part upon the weight of the load on the load supporting member, wherein the brake roller is rotatably mounted on bearings and, in order to prevent overloading of the brake roller bearings, the force transmitted to the brake roller bearings by the load is limited by limiting the amount of stressing of the resilient means.

9. A brake arrangement for a conveyor, comprising:

a conveyor frame defining a slot;

at least one conveyor roller including an axle mounted in said slot for supporting and transporting a load on the conveyor;

a brake frame mounted for movement relative to said conveyor frame;

a brake mounted on said brake frame for braking said conveyor roller;

a spring mounted on said brake frame so as to bias said brake in the direction of said conveyor roller;

wherein said conveyor roller is supported on said brake, such that, as the load on said conveyor roller increases, said conveyor roller pushes against the spring with increasing force, thereby increasing the braking force on the load.

10. A brake arrangement for a conveyor as recited in claim 9, wherein said slot has a bottom, and wherein, when the load reaches a certain weight, said axle reaches the bottom of said slot, so that the force exerted by said conveyor roller against said spring cannot increase further.

* * * * *